United States Patent [19]

Arnold et al.

[11] Patent Number: 5,200,495
[45] Date of Patent: Apr. 6, 1993

[54] RIGID-ROD BENZOBISAZOLE POLYMER CONTAINING CYCLIC PHOSPHATE ESTER

[75] Inventors: Fred E. Arnold, Centerville; Jom P. Chen, Hilliard, both of Ohio

[73] Assignee: The United States of America as represented by the Secretary of the Air Force, Washington, D.C.

[21] Appl. No.: 887,000

[22] Filed: May 22, 1992

[51] Int. Cl.$^5$ .............................. C08G 79/04
[52] U.S. Cl. .................... 528/168; 528/167; 528/183; 528/185; 528/186; 528/336; 528/337; 528/342
[58] Field of Search ............... 528/168, 167, 183, 185, 528/186, 337, 342; 525/434, 435

[56] References Cited

U.S. PATENT DOCUMENTS

| | | | |
|---|---|---|---|
| 4,892,921 | 1/1990 | Tsai et al. | 528/183 |
| 4,900,806 | 2/1990 | Arnold et al. | 528/337 |
| 4,960,853 | 10/1990 | Arnold et al. | 528/183 |
| 4,960,859 | 10/1990 | Arnold et al. | 528/342 |
| 5,021,580 | 6/1991 | Lysenko | 546/307 |
| 5,081,256 | 1/1992 | Arnold et al. | 548/159 |

OTHER PUBLICATIONS

Chen, J. P. and Arnold, F. E., "Rigid-Rod Benzobisazole Polymers Containing Cyclic Phosphate Ester Groups" Polymer Preprints, 32 (199), pp. 209-210, Jun. 1991.

*Primary Examiner*—Harold D. Anderson
*Attorney, Agent, or Firm*—Charles E. Bricker; Donald J. Singer

[57] ABSTRACT

Rigid-rod aromatic heterocyclic polymers having repeating units of the formula:

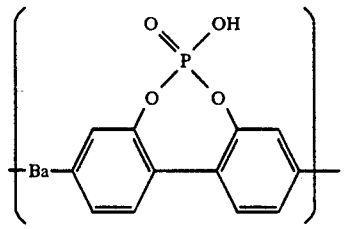

wherein Ba is a benzobisazole moiety of the formula:

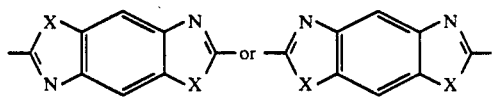

wherein X is —O—, —S— or —NH.

8 Claims, No Drawings

RIGID-ROD BENZOBISAZOLE POLYMER CONTAINING CYCLIC PHOSPHATE ESTER

RIGHTS OF THE GOVERNMENT

The invention described herein may be manufactured and used by or for the Government of the United States for all governmental purposes without the payment of any royalty.

BACKGROUND OF THE INVENTION

This invention relates to high molecular weight benzobisazole polymers containing cyclic phosphate esters.

Para-ordered, rigid-rod aromatic heterocyclic polymers, such as poly(p-phenylenebenzobisthiazole) (PBT), poly(p-phenylenebenzobisoxazole) (PBO) and poly(p-phenylenebenzobisimidazole) (PBI) are well known for their outstanding thermal, physical and chemical properties. These polymers exhibit lyotropic behavior in strongly acidic solvents, such as methanesulfonic acid (MSA) or polyphosphoric acid (PPA) and can be readily spun into fibers or made into films which have exceptional tensile strength and modulus. The high thermooxidative stability of these fibers and films, together with their exceptional tensile properties and electrical non-conductivity make them obvious candidates for reinforcement in advanced composite materials.

The surface properties of high modulus materials have a strong impact on many if not most of their applications. The chemical structure and thermodynamic of polymer surfaces are important factors that determine may of their practical characteristics. Properties affected by polymer surface structure include adhesion, wettability friction, coatability and dyeability. Interfacial characteristics of reinforcing rigid-rod systems control adhesive strength of laminates and therefore the mechanical properties of composite materials.

Accordingly, it is an object of the present invention to provide a method for controlling the surface properties of rigid-rod aromatic heterocyclic polymers.

Another object of the present invention is to provide novel rigid-rod aromatic heterocyclic polymers.

Other objects and advantages of the invention will be apparent to those skilled in the art.

SUMMARY OF THE INVENTION

In accordance with the present invention there are provided rigid-rod aromatic heterocyclic polymers having repeating units of the formula:

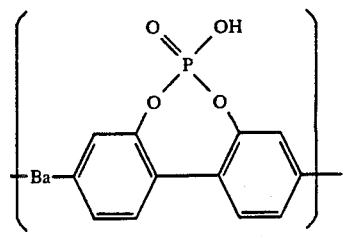

wherein Ba is a benzobisazole moiety of the formula:

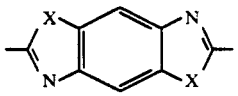

wherein X is —O—, —S— or —NH. It will be appreciated by those skilled in the art that one nitrogen atom and X moiety can be in either the cis-position or the trans-position with respect to the other nitrogen atom and X moiety. Thus, Ba can also be represented as

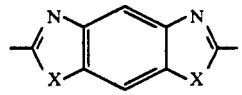

wherein X is as defined above.

The polymer of this invention is prepared by the polycondensation of 4,4'-dicarboxy-2,2'-dihydroxybiphenyl or its acid halide or nitrile with diaminobenzenedithiol dihydrochloride, diaminodihydroxybenzene dihydrochloride or tetraaminobenzene tetrahydrochloride to produce the corresponding benzobisthiazole, benzobisoxazole and benzobisimidazole polymer, in polyphosphoric acid as shown by the following reaction:

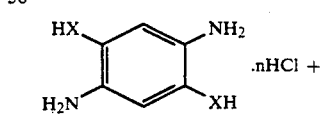

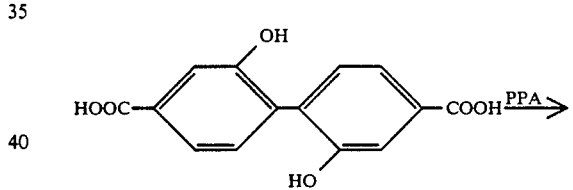

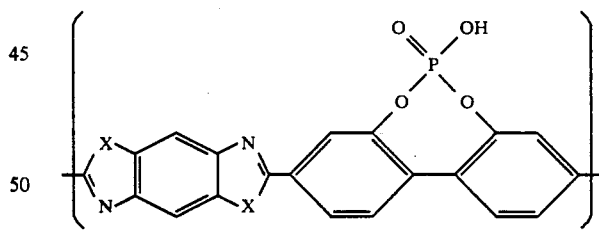

wherein n is 2 or 4, depending on the number of —NH$_2$ groups in the amino monomer. The polymerization is carried out in polyphosphoric acid (PPA) at polymer concentrations of about 7 to 15 percent (w/w) at a reaction temperature of about 140° to 200° C.

In carrying out the polymerization, stoichiometric amounts of the monomers are heated in 77-78% PPA at about 80°-90° C. for about 6 to 24 hours to effect dehydrochlorination of the amine monomer. This step is carried out under reduced inert atmosphere, e.g., nitrogen at about 60 mm, to facilitate removal of the hydrogen chloride. After complete dehydrochlorination, the temperature is reduced to about 50° C. and phosphorus pentoxide (P$_2$O$_5$) is added to adjust the P$_2$O$_5$ content to 83-84%.

Following dehydrochlorination, the reaction mixture is heated, under an inert atmosphere, at a temperature of about 100° to 200° C. for about 18 to 36 hours. In a preferred procedure, the reaction temperature is increased gradually during the reaction period, e.g., about 95°-125° C. for about 16 hours, 150°-170° C. for about 7 hours and 180°-195° C. for 5 hours. At the end of the reaction period, a small aliquot of the polymer is precipitated from solution into water, washed with water until acid-free and air dried. If the intrinsic viscosity of the polymer in methanesulfonic acid is not within the desired range of about 3-15 dl/g, polymerization is continued until an aliquot sample has the desired viscosity.

Intrinsic viscosity is determined by extrapolation of η rel-1/c and ln η rel/c to zero concentration in methanesulfonic acid at 30° C.

At the end of the reaction period, the polymer is precipitated from solution by pouring the reaction mixture into a coagulation bath, such as water or methanol. If a bulk polymer is desired, the reaction mixture is poured directly into the coagulation bath with or without stirring. The polymer may also be formed into fibers or films by extruding the polymer/PPA solution through a suitable spinnerette or die into the coagulation bath. The resulting fiber or film can be drawn and heat-treated following known procedures. The swollen film or fibers can be reacted with metallic acetates or strong metallic bases to give the corresponding rigid-rod ionomers, for example:

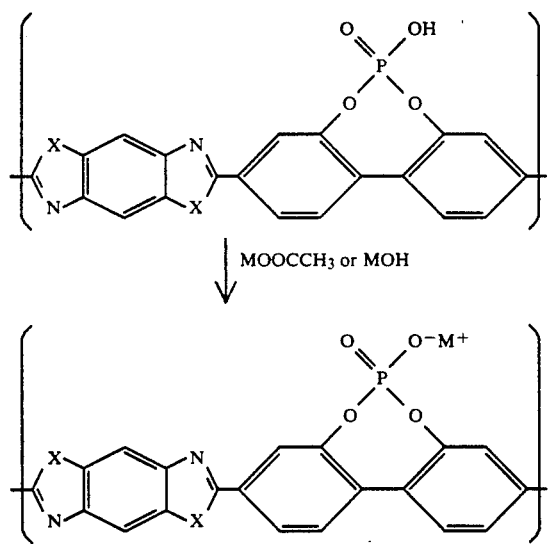

wherein M is an alkali metal.

The 4,4'-dicarboxy-2,2'-dihydroxybiphenyl is prepared from m-hydroxybenzoic acid as shown by the following reaction sequence:

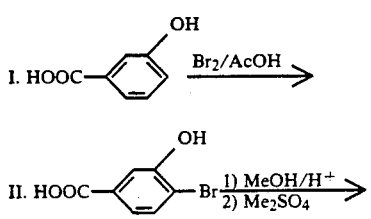

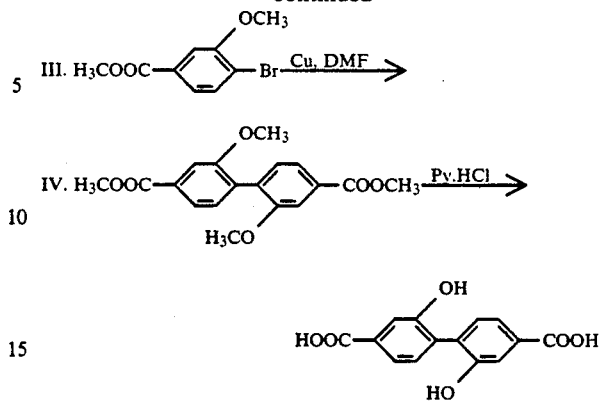

The m-hydroxybenzoic acid is first brominated in acetic acid (Step I). Esterification and protection of the hydroxy groups by methylation (Step II) gives methyl-4-bromo-3-methoxybenzene. Copper coupling in dimethylformamide (DMF) (Step III) provides the biphenyl moiety which is subsequently demethylated and hydrolized with pyridine hydrochloride (Py.HCl) (Step IV).

The following examples illustrate the invention.

EXAMPLE I 4,4'-Dicarboxy-2,2'-dihydroxybiphenyl

A solution of 17.6 g of bromine in 15 ml of acetic acid was added dropwise over a period of one hour to a solution of 15.2 g of m-hydroxybenzoic acid in 44 ml of acetic acid. The resulting solution was stirred for 6 hours at 15°-20° C. The solid was collected and recrystallized from 150 ml of water. 3.4 g of 4-bromo-3-hydroxybenzoic acid was obtained (mp 232°-4° C.).

3.0 g of the 4-bromo-3-hydroxybenzoic acid in 45 ml methanol was refluxed for 18 hours with 1.2 ml conc. sulfonic acid yielding 2.7 g of the methyl ester (mp 126°-7° C., from ether/hexane). 2.85 g of the ester in 19 ml of acetone was refluxed for 8 hours with 1.4 ml of dimethyl sulfate and 2.5 g anhydrous potassium carbonate to give 2.63 g of 4-bromo-3-methoxymethylbenzoate (mp 61° C.).

2.5 g of 4-bromo-3-methoxymethylbenzoate in 15 ml of dimethylformamide was heated to 140° C. 2.0 g of activated copper was added in one portion. The mixture was refluxed for 4 hours. Another 2.4 g of activated copper was added and the solution refluxed for 65 hours. The solution was cooled to room temperature and poured into 500 ml of water. The solid was collected, then extracted with 2-30 ml portions of ethanol to give 0.5 g of the biphenyl diester (mp 173°-4° C.).

0.32 g of the biphenyl diester and 2.0 g of pyridine hydrochloride was heated to 200°-210° C. for 3 hours under a nitrogen atmosphere. The mixture was cooled to 100° C. and a solution of 1 ml conc HCl and 5 ml water was added. The solid was collected and washed with water then dried in air to give 4,4'-dicarboxy-2,2'-dihydroxybiphenyl in quantitative yield. The compound melts and decomposes at 360° C. IR (KBr): 3400-2500 (b), and 1700 (s) cm$^{-1}$; $^1$HNMR (DMSO): δ9.7 (b), 7.5 (s,2H), and 7.1-7.5 (m, 4H).

EXAMPLE II

Poly((benzo(1,2-d:4,5d')bisthiazole-2,6-diyl(2,2'-phosphate-4,4'-biphenylene)))

In a resin flask equipped with a mechanical stirrer, nitrogen inlet and outlet was placed 4.658 g (19 mmol) of 2,5-diamino-1,4-benzenedithiol dihydrochloride, 5.210 g (19 mmol) of 4,4'-dicarboxy-2,2'-dihydroxybiphenyl and 30.6 g of PPA (77% $P_2O_5$). The mixture was dehydrochlorinated under reduced pressure (176 mm) by heating to 90° C. for 2.5 hours. The reaction mixture was cooled to 50° C. and 14 g of $P_2O_5$ was added, thereby providing a polymer concentration of 10%.

Under a positive nitrogen flow, the mixture was heated at 130° C. for 16 hours, 155° C. for 5.5 hours, 170° C. for 16 hours and 195° C. for 6 hours. The polymer was precipitated into water, collected by suction filtration, washed with water, washed with methanol, then dried under reduced pressure (0.02 mm) at 110° C. An intrinsic viscosity of 9.7 dl/g was obtained in MSA at 30° C.

The thermal properties were investigated using thermogravimetric mass-spectral analysis, in vacuo, at a heating rate of 3° C./min. The initial product of the thermal degradation was water maximizing at 120° C. and 400° C., which suggests the cyclic ester exists as a hydrate. At the highest temperatures of the experiment (800°-1000° C.), a series of phosphorous-containing products were obtained, namely $P_n$ phosphorous hydrides. Many of the other products found were from PBT degradation modified by the presence of oxygen. Other products were HCN, $NH_3$, $H_2S$ and $CS_2$, appearing at 670° and 790° C.

EXAMPLE III

Poly((benzo(1,2-d:4,5d')bisoxazole-2,6-diyl(2,2'-phosphate-4,4'-biphenylene)))

In a resin flask equipped with a mechanical stirrer, nitrogen inlet and outlet was placed 2.13 g (10 mmol) of 4,6-diamino-1,3-benzenediol dihydrochloride, 2.74 g (10 mmol) of 4,4'-dicarboxy-2,2'-dihydroxybiphenyl and 15 g of PPA (77% $P_2O_5$). The mixture was dehydrochlorinated under reduced pressure (176 mm) by heating to 90° C. for 1 hour. The reaction mixture was cooled to 50° C. and 7.0 g of $P_2O_5$ was added, thereby providing a polymer concentration of 10%.

Under a positive nitrogen flow, the mixture was heated at 100° C. for 2 hours, 135° C. for 18 hours, 160° C. for 6 hours, 180° C. for 17 hours and 190° C. for 4 hours. The polymer was precipitated into water, collected by suction filtration, washed with water, washed with methanol, then dried under reduced pressure at 110° C. An intrinsic viscosity of 3.97 dl/g was obtained in MSA at 30° C.

EXAMPLE IV

Poly((benzo(1,2-d:4,5d')bisimidazole-2,6-diyl(2,2'-phosphate-4,4'-biphenylene)))

The procedure of Example III was followed except that 1,2,4,5-tetraaminobenzene tetrahydrochloride was employed in place of the 4,6-diamino-1,3-benzenediol dihydrochloride. An intrinsic viscosity of 7.8 dl/g was obtained in MSA at 30° C.

The polymers of this invention are useful as reinforcement in structural composite applications.

Various modifications may be made to the invention as described without departing from the spirit of the invention or the scope of the appended claims.

We claim:

1. A rigid-rod aromatic heterocyclic polymer having repeating units of the formula:

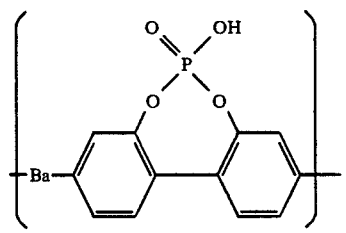

wherein Ba is a benzobisazole moiety of the formula:

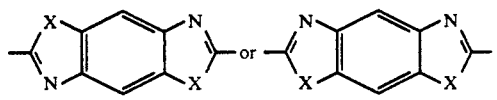

wherein X is —O—, —S— or —NH.

2. The polymer of claim 1 wherein X is —O—.
3. The polymer of claim 1 wherein X is —S—.
4. The polymer of claim 1 wherein X is —NH—.

5. A rigid-rod aromatic heterocyclic polymer having repeating units of the formula:

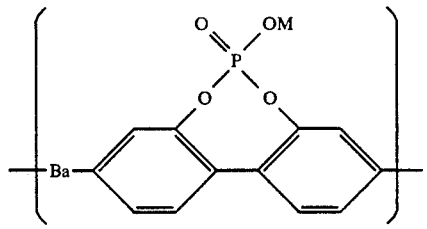

wherein M is an alkali metal and Ba is a benzobisazole moiety of the formula:

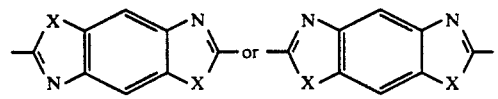

wherein X is —O—, —S— or —NH.

6. The polymer of claim 5 wherein X is —O—.
7. The polymer of claim 5 wherein X is —S—.
8. The polymer of claim 5 wherein X is —NH—.